Sept. 8, 1959  P. E. LUTKE  2,903,113
GREASE SEAL FOR AXIALLY ENGAGING CLUTCH
Filed June 28, 1957
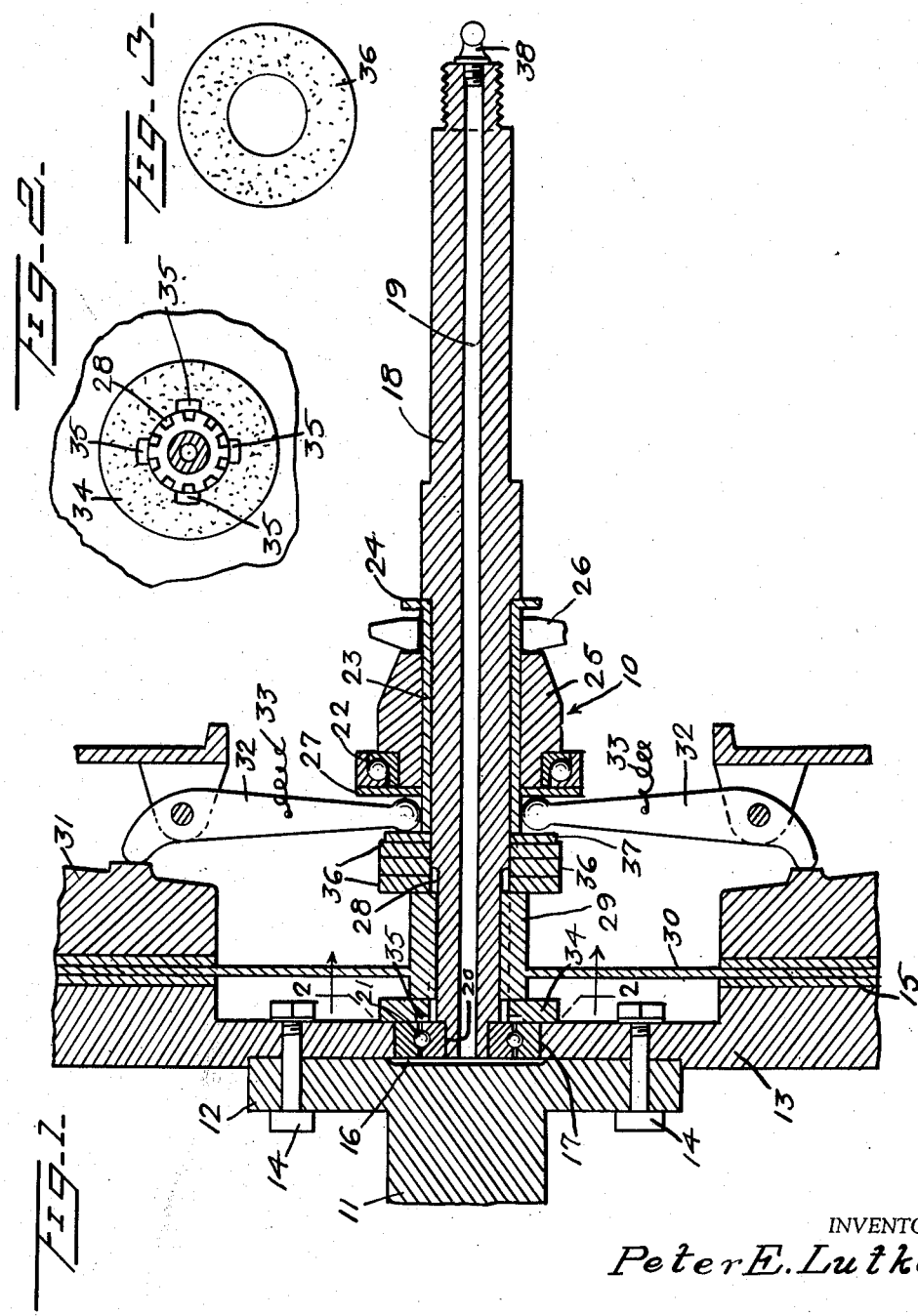
INVENTOR
Peter E. Lutke
BY Kimmel & Crowell
ATTORNEYS United States Patent Office 2,903,113
Patented Sept. 8, 1959

2,903,113

GREASE SEAL FOR AXIALLY ENGAGING CLUTCH

Peter Edward Lutke, Hobbs, N. Mex.

Application June 28, 1957, Serial No. 668,736

1 Claim. (Cl. 192—113)

The present invention relates to grease seals, and more particularly to lubricating grease seals for lubricating the pilot bearing and clutch splines of a clutch connection.

The primary object of the invention is to provide means for lubricating the pilot bearing and clutch splines of an internal combustion engine clutch, while simultaneously sealing the grease therein to prevent it from reaching the clutch faces.

Another object of the invention is to provide a device of the class described above wherein a convenient grease fitting is positioned for ready access by the standard greasing equipment.

A further object of the invention is to provide a grease sealing structure of the class described above which can be installed with minor changes in the engine structure without involving excess cost.

Other objects and advantages will become apparent in the following specification when considered in the light of the attached drawings, in which:

Figure 1 is a vertical longitudinal section taken through the invention.

Figure 2 is a transverse section taken along the line 2—2 of Figure 1, looking in the direction of the arrows.

Figure 3 is a front elevation of one of the grease seal members.

Referring now to the drawings in detail wherein like reference characters indicate like parts throughout the several figures, the reference numeral 10 indicates generally a clutch structure incorporating the instant invention.

The clutch structure 10 is used with a crankshaft 11 having a radial flange 12 formed on its rear end. A flywheel 13 of conventional construction is secured to the flange 12 by a plurality of attaching bolts 14. The flywheel 13 is provided with a rearwardly facing clutch engaging surface 15 which extends annularly thereabout.

The flange 12 of the crankshaft 11 is axially recessed at 16, for reasons to be assigned. The flywheel 13 is provided with an axial bore 17 aligned with the recess 16 in the flange 12.

A clutch shaft 18 is provided with an axial bore 19 extending completely therethrough and a reduced diameter end portion 20 on one end thereof. A ball bearing 21 is engaged over the reduced diameter portion 20 of the shaft 18 and is inserted in the bore 17 of the flywheel 13.

A second ball bearing 22 is engaged over a bracket clutch shifter tube 23 telescoped on the clutch shaft 18. A radial flange 24 is formed on one end of the bracket clutch shifter tube 23.

A cylindrical body 25 is slidably mounted on the clutch bracket shifter tube 23 supporting the bearing 22 at one end thereof and engaged by a shifting fork 26 at the other end thereof, for reasons to be assigned. An annular flat washer 27 is engaged over the tube 23 and is positioned in engagement with the bearing 22.

The shaft 18 is splined at 28 at the end thereof carrying the bearing 21 and supports the hub 29 of a disc clutch 30 in axial slidable position thereon.

A pressure plate 31 is arranged to engage the side of the disc clutch 30 opposite the flywheel 13 and to bear against the disc 30 to connect the flywheel 13 to the clutch shaft 18 upon operation of the shifting fork 26.

Pivoted links 32 engage the pressure plate 31 and the washer 27 and are normally biased into engagement with the pressure plate 31 by springs 33. Operation of the forks 26 moves the body 25, bearing 22, washer 27, and pivots the links 32 to release the pressure plate 31 from the clutch disc 30, disconnecting the flywheel 13 from the shaft 18.

The movement of the hub 29 on the shaft 18 is relatively slight and is permitted by the compressibility of the seals 34, 36.

An annular grease seal washer 34 is positioned between the hub 29 and the clutch 30 and the bearing 21 in encompassing relation to the splines 28. The grease seal 34 is provided with a plurality of recesses 35 overlying the bearing 21 and communicating with the splines 28 of the shaft 18.

A plurality of annular grease seal members 36 encompass the shaft 18 between the tube 23 and the hub 29 sealing the inner ends of the splines 28, as is shown in Figure 1. An annular metal washer 37 is positioned on the shaft 18 between the tube 23 and the grease seals 36 to protect the grease seals 36 from the links 32.

A grease fitting 38 is mounted in the bore 19 at the end thereof opposite the bearing 21 so that grease may be introduced into the bore 19 therethrough. The grease in the bore 19 under pressure passes into the recess 16 in the flange 12 and through the bearing 21. Grease passing rearwardly through the bearing 21 is guided by the recesses 35 into the splines 28 so as to lubricate the connection between the hub 29 and the shaft 18. The grease seals 36 effectively seal the splines 28 and the grease is retained therein out of contact with the friction faces of the clutch 30.

The structure of the clutch operating mechanism illustrated herein is not intended to limit the present application beyond the lubricating and sealing aspects thereof.

Having thus described the preferred embodiment of the invention, it should be understood that numerous structural modifications and adaptations may be resorted to without departing from the scope of the appended claim.

What is claimed is:

A grease sealing and lubrication system for clutches comprising an elongated clutch shaft, said clutch shaft having an axial bore extending therethrough, a grease fitting secured in one end of said bore, a flywheel positioned concentrically of the other end of said shaft, a roller bearing supporting said shaft centrally of said flywheel, a crankshaft flange secured to said flywheel and having an axial recess engaging over said bearing, a grease seal encompassing said shaft and engaging against said bearing and said flywheel on the side of said flywheel opposite said crankshaft flange, said grease seal having a plurality of conduit forming internal recesses, a clutch disc slidably engaged on said shaft for engagement with said grease seal, and a plurality of grease seals engaging the opposite side of said clutch disc and said shaft, whereby grease flowing through said clutch shaft lubricates said roller bearing and the sliding juncture of said clutch disc and said shaft with said grease seals retaining the grease within said clutch disc.

References Cited in the file of this patent

UNITED STATES PATENTS

| | | |
|---|---|---|
| 2,057,802 | Tatter | Oct. 20, 1936 |
| 2,060,692 | Rockwell | Nov. 10, 1936 |

FOREIGN PATENTS

| | | |
|---|---|---|
| 93,164 | Switzerland | Feb. 16, 1922 |